United States Patent
Akahane et al.

(10) Patent No.: US 7,433,301 B2
(45) Date of Patent: Oct. 7, 2008

(54) METHOD OF TRANSFERRING PACKETS AND ROUTER DEVICE THEREFOR

(75) Inventors: Shinichi Akahane, Hachioji (JP); Kazuo Sugai, Ebina (JP)

(73) Assignee: Hitachi, Ltd., Tokyo (JP)

(*) Notice: Subject to any disclaimer, the term of this patent is extended or adjusted under 35 U.S.C. 154(b) by 1002 days.

(21) Appl. No.: 10/173,651

(22) Filed: Jun. 19, 2002

(65) Prior Publication Data
US 2003/0053414 A1  Mar. 20, 2003

(30) Foreign Application Priority Data
Sep. 3, 2001  (JP)  ............................... 2001-265213

(51) Int. Cl.
*G01R 31/08* (2006.01)
(52) U.S. Cl. .................. 370/218; 370/228; 370/244; 370/392; 370/395.21; 709/239; 709/240
(58) Field of Classification Search ............... 370/238, 370/238.1, 389, 392, 397, 399, 395.2, 395.21, 370/395.3, 395.31, 395.42, 395.43; 709/238–242
See application file for complete search history.

(56) References Cited

U.S. PATENT DOCUMENTS

| | | | | |
|---|---|---|---|---|
| 6,041,037 | A  * | 3/2000 | Nishio et al. | 370/228 |
| 6,331,978 | B1 * | 12/2001 | Ravikanth et al. | 370/392 |
| 6,785,436 | B2 * | 8/2004 | Ravikanth et al. | 385/16 |
| 6,813,242 | B1 * | 11/2004 | Haskin et al. | 370/229 |
| 6,920,133 | B1 * | 7/2005 | Boodaghians | 370/389 |
| 6,987,727 | B2 * | 1/2006 | Fredette et al. | 370/225 |
| 6,987,762 | B2 * | 1/2006 | Shiota | 370/389 |
| 7,126,907 | B2 * | 10/2006 | Carpini et al. | 370/218 |
| 7,218,606 | B2 * | 5/2007 | Soumiya | 370/217 |

(Continued)

FOREIGN PATENT DOCUMENTS

EP  1 111 860 A2  12/2000

(Continued)

OTHER PUBLICATIONS

European Search Report dated Jun. 6, 2005.

(Continued)

*Primary Examiner*—Hassan Kizou
*Assistant Examiner*—Brian T O'Connor
(74) *Attorney, Agent, or Firm*—Reed Smith LLP; Stanley P. Fisher, Esq.; Juan Carlos A. Marquez, Esq.

(57) ABSTRACT

A router in a backup path in an MPLS network adopting a label stack method aims to achieve the same quality-guarantee control as the one performed in a current path. In a packet transfer device accommodating first and second output lines, when the first line has a fault, upon a first packet being received, communication quality information in a header of the first packet is copied. A first header containing the copied priority information and a new label is added to the first packet, and the first packet is outputted to a second output line. When a second packet is received, communication quality information in a header of the second packet is copied, a second header containing the copied priority information and the new label is added to the second packet, and the second packet is outputted to the second output line.

5 Claims, 16 Drawing Sheets

U.S. PATENT DOCUMENTS

| | | | | |
|---|---|---|---|---|
| 7,227,867 | B1 * | 6/2007 | Ferguson et al. | 370/395.5 |
| 7,243,161 | B1 * | 7/2007 | Tappan et al. | 709/245 |
| 7,246,175 | B1 * | 7/2007 | Tappan et al. | 709/245 |
| 7,266,124 | B2 * | 9/2007 | Kim et al. | 370/397 |
| 7,283,477 | B1 * | 10/2007 | Fedyk et al. | 370/237 |
| 7,315,510 | B1 * | 1/2008 | Owens et al. | 370/218 |
| 2003/0043792 | A1 * | 3/2003 | Carpini et al. | 370/386 |
| 2006/0215548 | A1 * | 9/2006 | Le Faucheur et al. | 370/228 |

FOREIGN PATENT DOCUMENTS

EP    1 111 860 A3    12/2000

OTHER PUBLICATIONS

Le Faucheur et al, "MPLS Support of Differentiated Services", IETF Internet Draft, Apr. 2001, pp. 1-53.

T. Li et al., "A Provider Architecture for Differentiated Services and Traffic Engineering (PASTE)" Network Working Group, Informational, Oct. 1998, pp. 1-17.

E. Rosen et al., "Multiprotocol Label Switching Architecture", Network Working Group, Standards Track, Jan. 2001, pp. 1-11.

Japanese Office Action regarding Japanese Application No. 2001-265213 dated Feb. 4, 2008 in Japan.

Iijima, Tomoyuki et al.; "Fast Reroute Maintaining Prioriry Class in the MPLS Network", 4 pages in Japanese with English translation pp. 2-8.

Le Faucheur, Francois et al.; "MPLS Support of Differentiated Services", IETF Internet Draft; draft-ietf-mpls-diff-ext-04.txt, Mar. 2000, pp. 1-36.

* cited by examiner

FIG. 13

| SEARCH KEY | | | | SEARCH RESULT | | | |
|---|---|---|---|---|---|---|---|
| INPUT LABEL INFORMATION | | NO. OF POP(S) | NO. OF PUSH(ES) | OUTPUT LABEL INFORMATION | | OUTPUT LINE NUMBER | IN-DEVICE QoS INFORMATION |
| LABEL | EXP | | | LABEL 1 | LABEL 2 ...... | | |
| L11 | E1 | 1 | 1 | L12 | — ...... | 1 | Q1 |
| L21 | E2 | 1 | 1 | L22 | — ...... | 1 | Q2 |
| L21 | E3 | 1 | 1 | L22 | — ...... | 1 | Q3 |
| ...... | ...... | ...... | ...... | ...... | ...... | ...... | ...... |

FIG. 14

| SEARCH KEY | | | | SEARCH RESULT | | | |
|---|---|---|---|---|---|---|---|
| INPUT LABEL INFORMATION | | NO. OF POP(S) | NO. OF PUSH(ES) | OUTPUT LABEL INFORMATION | | OUTPUT LINE NUMBER | IN-DEVICE QoS INFORMATION |
| LABEL | EXP | | | LABEL 1 | LABEL 2 | | |
| L11 | E1 | 1 | 2 | L31 | L12 | 2 | Q1 |
| L21 | E2 | 1 | 2 | L31 | L22 | 2 | Q2 |
| L21 | E3 | 1 | 2 | L31 | L22 | — | 2 | Q3 |
| ...... | ...... | ...... | ...... | ...... | ...... | ...... | ...... |

FIG. 16

| LINE NUMBER | LINE STATUS |
|---|---|
| 1 | 1 |
| 2 | 0 |
| ⋮ | ⋮ |
| N | 0 |

| SEARCH KEY | | | SEARCH RESULT (CURRENT) | | | | | | SEARCH RESULT (RESERVE) | | | | | |
|---|---|---|---|---|---|---|---|---|---|---|---|---|---|---|
| INPUT LABEL INFORMATION | | | NO. OF POP(S) | NO. OF PUSH(ES) | OUTPUT LABEL INFORMATION | | | OUTPUT LINE NO. | IN-DEVICE QoS INFORMATION | NO. OF POP(S) | NO. OF PUSH(ES) | OUTPUT LABEL INFORMATION | | | OUTPUT LINE NO. | IN-DEVICE QoS INFORMATION |
| LABEL | EXP | | | | LABEL1 | LABEL2 | ...... | | | | | LABEL1 | LABEL2 | ...... | | |
| L11 | E1 | 1 | 1 | L12 | — | — | 1 | Q1 | 1 | 2 | L31 | L12 | — | 2 | Q1 |
| L21 | E2 | 1 | 1 | L22 | — | — | 1 | Q2 | 1 | 2 | L31 | L22 | — | 2 | Q2 |
| L21 | E3 | 1 | 1 | L22 | — | — | 1 | Q3 | 1 | 2 | L31 | L22 | — | 2 | Q3 |
| ...... | | ...... | ...... | ...... | ...... | ...... | | ...... | ...... | ...... | ...... | ...... | | ...... | ...... |

1320  1323-1  1323-2

METHOD OF TRANSFERRING PACKETS AND ROUTER DEVICE THEREFOR

BACKGROUND OF THE INVENTION

The present invention relates to a method of transferring packets and a device therefor. In particular, it relates to a method of transferring packets and a device corresponding to Multi Protocol Label Switching.

Internet Protocol (IP) network is becoming one of the important infrastructure which would replace the telephone network because of its low cost. Accordingly, achievement of high reliability which has been achieved in the conventional telephone network such as recovery in the event of a fault in the network, etc. and guarantee of Quality of Service (QoS) such as reduced delay time and low discarding rate are requested.

As a recovery system of a failure in the network, a high-speed path switching technique using Multi Protocol Label Switching (MPLS) is known. With reference to MPLS, there is a description in RFC 3031 of Internet Engineering Task Force (IETF). Also, with reference to a high-speed path switching technique using MPLS, there is a description in draft-ietf-mpls-rsvp-lsp-fastreroute-00.tx, Internet draft of IETF.

First, an outline of MPLS will be described. MPLS is a packet transfer system in which a router determines the destination of a packet according to a value of a label added to the packet. With reference to FIG. 1, the outline of the packet transfer using MPLS will be described.

MPLS network 100 of FIG. 1 comprises edge routers ER1 (141), ER2 (142), ER3 (143), ER4 (144), which are located at the ports of the network, and core routers CR1 (151), CR2 (152), CR3 (153), which are located in the MPLS network 100.

Each edge router accommodates a plurality of networks NA (161), NB (162), NC (163) and ND (164) which are connected with one another via the MPLS network. Each edge router receives a packet from a network that it accommodates, encapsulates the received packet by an MPLS encapsulation header, and transfers it into the MPLS network 100. In FIG. 1, among contents of the MPLS encapsulation header, a label alone is shown for the sake of convenience. For example, the edge router ER1 encapsulates a packet P1 (171) received from the network NA by the MPLS encapsulation header containing a label L11 (111), and transfers it to the CR1. At this point, MPLS encapsulation headers for an output line 181, the label L11, etc. are determined by using information in the header such as a Layer 3 transfer protocol (for example, IP) of the packet P1.

The core routers CR1, CR2 determine an output line and a new encapsulation header for outputting by using the MPLS encapsulation header. For example, upon receipt of the packet P1, the CR1 searches a label table held therein using a value of the label L11 added to the packet P1, and determines an output line 1020-1 and a label L12 (112) for outputting. The CR1 swaps the label L11 added to the packet P1 for the label L12 for outputting, and transmits the packet to the output line 1020-1. Hereinafter, a label added to a received packet is called an input label and a label newly added by a router when being transferred is called an output label. Likewise, the CR2 determines an output line 182 and an output label L13 (113) of the packet P1 to which the input label L12 is added, swaps the input label L12 for the output label L13, and transmits the packet to the output line 182.

Upon receipt of the packet P1 to which the label L13 is added, the edge router ER3, using the label L13 alone, or using the label L13 and information in the Layer 3 transfer protocol (for example, IP) header of the packet P1, determines a place to which the packet P1 is transmitted (in FIG. 1, Network NC) and the output line 183, removes an MPLS encapsulation header, and transmits the packet P1 to the line 183. A packet P2 is also transferred as described above.

As described above, the packet P1 is transmitted through a path between the routers ER1 and CR1, a path between the routers CR1 and CR2, and a path between the routers CR2 and ER3 by using labels L11, L12 and L13. Also, a packet P2 is transmitted through a path between the routers ER2 and CR1, a path between the routers CR1 and CR2, and a path between the routers CR2 and ER4 by using labels L21, L22 and L23. These paths are called Label Switched Paths (LSP). LSPs are set by a label distribution protocol, or set manually by a network administrator. Label distribution protocols include Label Distribution Protocol (LDP), Constraint-based Routing Label Distribution Protocol (CR-LDP), Extensions to Resource Reservation Protocol for LSP Tunnels (RSVP-TE), etc. Description is made with reference to LDP in RFC 3036 of IETF, with reference to CR-LDP, in draft-ietf-mpls-cr-ldp-04.txt, Internet Draft, and with reference to RSVP-TE, draft-ietf-mpls-rsvp-lsp-tunnel-08.txt, Internet Draft, respectively.

In MPLS, it is possible to explicitly set the LSP. Therefore, it can advantageously provide paths based on the requested communication quality for each traffic and achieve traffic engineering for performance optimization of the network.

Now, with reference to FIGS. 2 and 3, a high-speed path switching technique using MPLS, which is described in draft-swallow-rsvp-bypass-label-01.txt will be explained.

In this high-speed path switching technique, with respect to a plurality of LSPs set on the same line, only one LSP for switching when the line or next map router has a fault is set. Hereinafter, an LSP for switching in the case of failure is called a backup LSP, and an LSP during a normal operation is called a current LSP. Further, in the high-speed pass switching technique, for the purpose of saving the number of entries of the label table for determining an output label and an output line at the terminal router of the backup LSP, a label stacking technique to add two or more labels is used.

FIGS. 2 and 3 show the MPLS network 100 alone of FIG. 1, and the networks NA, NB, NC, ND are omitted.

FIG. 2 shows how packets are transferred when the line 1020-1 is normal. Further, FIG. 3 shows how packets are transferred in the case when a failure occurs in the line 1020-1 (indicated by "X" on the line 1020-1 of FIG. 3).

In FIG. 2, an LSP to which the packet P1 is transferred when the line 1020-1 is normal is called LSP1, and an LSP to which the packet P2 is transferred is called LSP2. A label used for transfer is the same as the one in FIG. 1. Labels used in the LSP1 are the label L11 (111) between the routers ER1 and CR1, the label L12 (112) between the routers CR1 and CR2, and the label L13 (113) between the routers CR2 and ER 3. Also, labels used in the LSP2 are the label L21 (121) between the routers ER2 and CR1, the label L22 (122) between the routers CR1 and CR2, and the label L23 (123) between the routers CR2 and ER4.

In FIG. 3, a backup LSP3 for the LSP1 and the LSP2 set on the line 1020-1 are set on the line 1020-2 between the routers CR1 and CR3 and on the line 184 between the routers CR3 and CR2. A label used between the routers CR1 and CR3 is called L31 (131), and a label used between the routers CR3 and CR2 is called L32 (132).

Referring to FIG. 3, a method of transferring the packet P1 when the line 1020-1 has a fault will be described. When detecting the fault on the line 1020-1, the core router CR1 of FIG. 3 changes the number of output labels corresponding to the input label L11 in the label table from one (L12) to two (L12 and L31). Further, the core router CR1 change the output line from the line 1020-1 to the line 1020-2. Upon receipt of the packet P1, the router CR1 determines the output labels L12, L31 and the output line 1020-2 from the input label L11. Then, the input label L11 is removed from the packet P1, and the two output labels are added by using a label stack function. At this point, the label L31 to be used in a backup LSP is added at a higher position (a position from which data is transferred with priority) of the label L12 used in the current LSP1. Then, the CR1 transmits the packet P1 to the line 1020-2. Upon receipt of the packet P1, the CR3 uses only the label L31 added at the higher position out of the two labels added to the packet P1, and determines the output line 184 and the output label L32. Among the input labels of the packet P1, the CR3 swaps only the label L31 added at the higher position for the output label 32, and transmits it to the line 184. Upon receipt of the packet P1 transmitted from the CR3, the CR2 acknowledges itself as a terminal of a backup LSP3 from a value of the label L32 added at a higher position among the two labels added to the packet P1, and recognizes that the output line and the output label should be determined by using the label L12 added at a lower position of the label L32. Then, the CR2 determines the output line 182 and the label L13 for outputting by using the Label L12. The CR2 removes the label L32 added to the packet P1, swaps the label L12 for the output label L13, and transmits it to the line 182.

A method of transferring the packet P2 is also the same as that of the packet P1 except the following points. Of the two output labels added by the CR1, the label L31 added at a higher position is the same as the case of the P1, but the other label is the L22, which is different. Further, an output label at the CR2 is the Label 23, which is also different. As described above, both the packet P1 transferred in the current LSP1 and the packet P2 transferred in the current LSP2 are transferred likewise in the LSP3.

Further, in FIG. 3, the CR2, which is the terminal of a backup LSP, recognizes itself to be a terminal of the backup LSP3 by using the label L32 at a higher position and that an output line and an output label should be determined by using the label (L12 or L22) added at a lower position of the L32. On this occasion, in the case of the CR2, a label table have to be searched twice according to a certain search method of the label table, which requires longer processing time. In order to avoid this problem, there is a method (Penultimate Hop Popping: hereinafter, called "PHP method") which removes, in advance, a label added at a higher position by the last router but one before the terminal of the backup LSP. This method will be described referring to FIG. 4.

In FIG. 4, a label adding method and a packet transfer method are almost the same as the methods described in FIG. 3. However, a label adding method at the router CR3 immediately before the terminal router CR2 of the backup LSP3 is different. Using the label L31 added at a higher position of the received packets P1, P2, the CR3 acknowledges itself to be the router immediately before the terminal of the backup LSP3. The labels L12, L22 added at the lower position of the label L31 are the same labels used between CR1 and CR2 for transfer in the current LSPs, LSP1, LSP2. Accordingly, by using this label, the CR2 can determine the same output line and the output label as those of the current LSP. Therefore, the CR3 removes only the label L31 added at a higher position, and transmits the packet to the output line 184. The router CR2 receiving the packet uses one of the added labels L12, L22, and determines the output line and the output label. With the use of the PHP method described above, it is enough to search the label table in the CR2 only once, and the processing time becomes equal to the one in the transfer processing using the current LSP.

According to the prior art described above, a common backup LSP is set for a plurality of LSPs set in the same line. Therefore, compared to a method of setting a backup LSP for each of the LSPs, the number of LSPs to be managed by the router in the MPLS network can be reduced. For example, when the number of LSPs set in a line is "N", the number of LSPs to be managed by the prior art 1 is "(N+1)". However, when setting backup LSPs one to one with respect to a plurality of LSPs, the number of LSPs to be managed is "2N".

However, in the above prior art, to guarantee communication quality in the backup LSP is not discussed. Now, the problems with regard to the guarantee of communication quality in the backup LSP will be described below.

For example, in FIG. 2, it is presumed that a group of packets P1 (hereinafter, referred to as "Traffic 1") transferred by using the LSP1 is data that can be transferred by a Best Effort method such as Electronic mail and World Wide Web data, etc. Further, it is presumed that a group of packets P2 (hereinafter, referred to as "Traffic 2") transferred by the LSP2 is data whose delay and delay variation should be reduced to minimum, such as data of a real-time system, Voice Over IP, etc.

In FIG. 2, each router can determine communication quality to be achieved by the LSP1 and the LSP2 according to information of an MPLS encapsulation header including a label, and performs communication quality control such as transferring the LSP2 prior to the LSP1. However, when the line has a fault (FIG. 3 or FIG. 4), Traffic 1 and Traffic 2 transferred by the current LSP1 and LSP2 are both transferred by the backup LSP3 using the same label. In this case, since the router CR3 on the LSP3 cannot recognize the communication quality of the current LSP, it cannot transfer the LSP2 prior to the LSP1. Accordingly, the guarantee of the communication quality with respect to Traffic 2 once transferred by the current LSP2 cannot be achieved on the backup LSP3.

Therefore, in order to perform the quality guarantee control (QoS control) of the packet, such a system is required that a router on the backup LSP can recognize the communication quality of the current LSP.

SUMMARY OF THE INVENTION

In one aspect, the present invention relates to a method of transferring packets for a packet transfer device accommodating a first output line, which is a current path, and a second output line, which is a backup path, and transferring a packet comprising a header and data containing a label for switching the packet and communication quality information of the packet. In the case when the first line does not have a fault, upon a first packet being received, a label in the header of the first packet is rewritten, and the packet whose label is rewritten is outputted to a first output line. Upon a second packet being received, a label in the header of the second packet is rewritten, and the packet whose label is rewritten is outputted to the first output line. In the case when the first line has a fault, upon the first packet being received, communication quality information in the header of the first packet is copied, and an additional header containing the copied priority information and an additional label is added to the first packet, and the packet to which the additional header is added is outputted to the second output line. When the second packet is received, communication quality information in the header of the second packet is copied, and the additional header containing the copied priority information and the additional label is added to the second packet, and the packet to which the additional header is added is outputted to the second output line. In the manner described above, an additional header is added to the packet to be transmitted to the backup path, and communication quality is defined by the additional header.

In another aspect, the present invention relates to processing of the packet containing the additional header formed as above. What is claimed in the present invention is a method of transferring packets for a packet transfer device which has an associating table for a label added to the inputted packet and a label added to the packet to be outputted, and switches the packet inputted from the input line to the output line corresponding to a label added to the packet. In this packet transfer method, a first header containing a first label and identification information of communication quality of the packet is added before data. Further, when a packet to which a second header (additional header) containing a second label (additional label) and identification information of the communication quality is added is received, priority control of the packet transfer is performed based on the identification information of communication quality in the second header. The second header may be placed before the first header. In this case, an output label is obtained by searching the table based on the second label. The second label is swapped for an output label, which can be outputted to the output line. Also, the second header may be removed from the received packet, and the packet whose second header is removed can be outputted to the output line. Further, the first and second headers are Shim headers described in Request for Comments (RFC) 3032, the identification information of communication quality is a value of an Experimental Use (EXP) field of the first header, and the value of the EXP field of the first header and a value of the EXP field of the second header are made to be equal to each other. The essentials of the present invention are a transmission method of those packets and a device configuration for achieving it.

Other aspects of the present invention will be described in the section of embodiments and with reference to the drawings.

BRIEF DESCRIPTION OF THE DRAWINGS

FIG. 13 shows a configuration of the label table 1320;

FIG. 14 shows a configuration of the label table 1320, whose set value is different from the one in FIG. 13;

FIG. 16 shows a configuration of a line status table; and

FIG. 17 shows another configuration of the label table 1320, which is different from the ones in FIGS. 13 and 14.

DETAILED DESCRIPTION OF THE PREFERRED EMBODIMENTS

Figure 5:
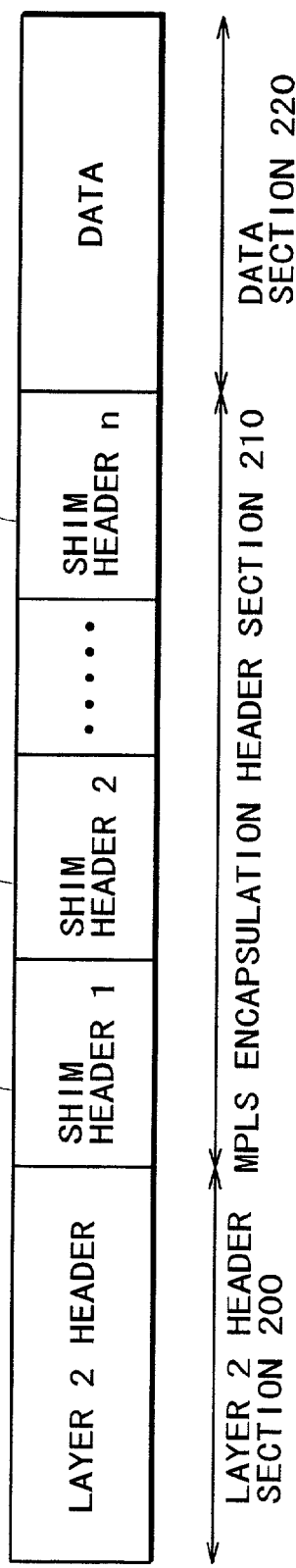
FIG. 5 shows a format of a packet in an MPLS network.

First, with reference to FIGS. 5 and 6, a data format of an MPLS encapsulated packet and a format of an MPLS encapsulation header will be described. FIG. 5 shows the data format of the MPLS encapsulated packet. The MPLS encapsulated packet comprises a Layer 2 header section 200, which is a header of a Layer 2 protocol for PPP, Ethernet, etc., an MPLS encapsulation header section 210, and a data section 220, which is packet data. The MPLS encapsulation header section 210 is comprised of n Shim headers (n is an integer larger than 1), namely, Shim header 1 to Shim header n (210-1 to 210-n). The data section 220 is, for example, data which is encapsulated by a Layer 3 protocol header such as IP, etc.

Figure 1:
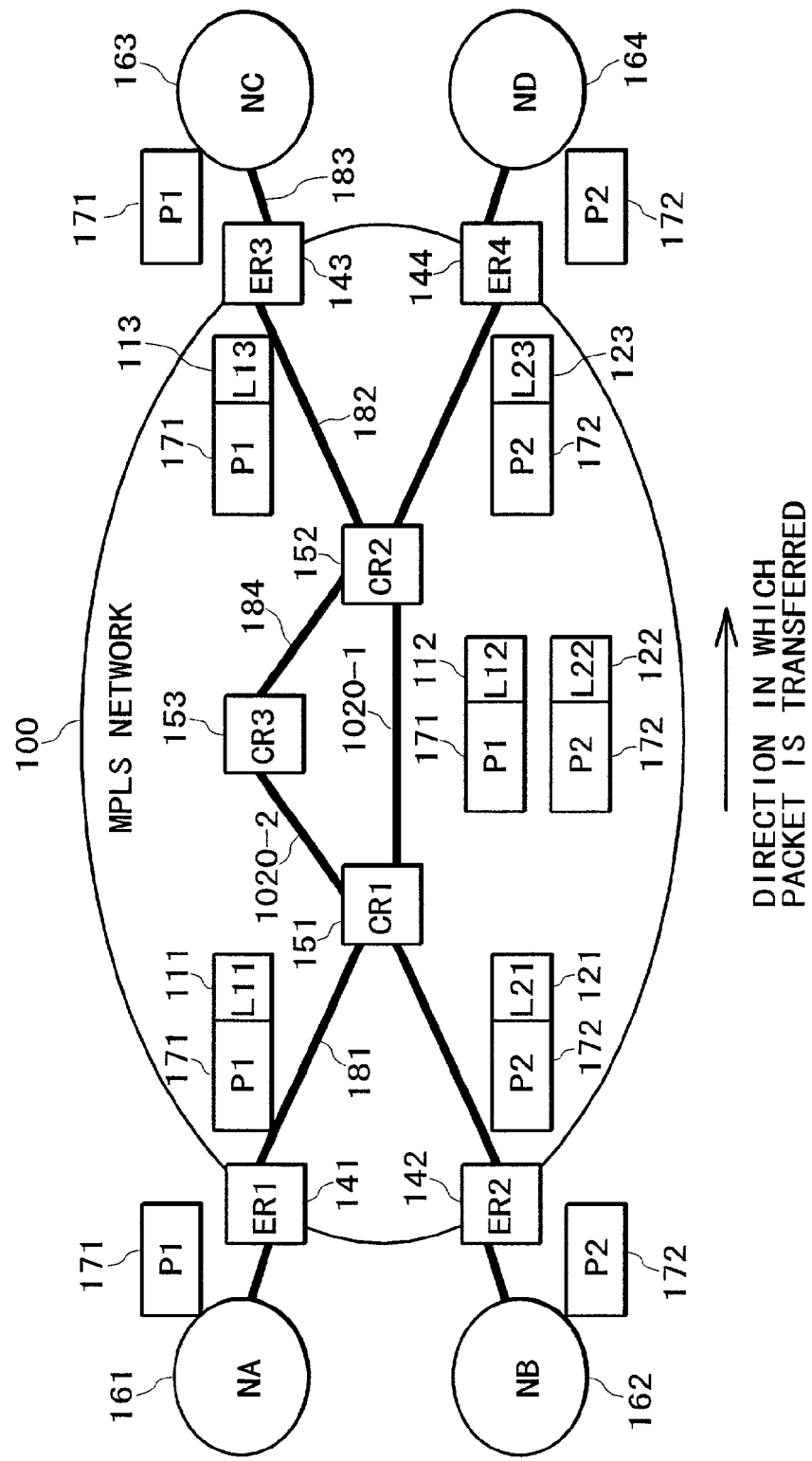
FIG. 1 illustrates how a packet is transferred by MPLS.
Figure 6:
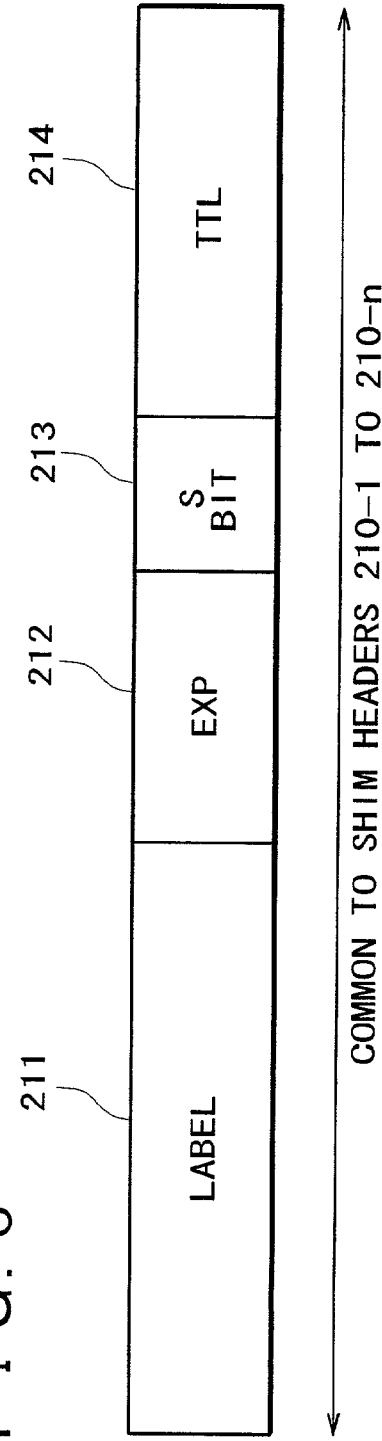
FIG. 6 shows a format of a Shim header, which is an MPLS encapsulation header.

FIG. 6 shows a format of a Shim header constituting the MPLS encapsulation header section. The format of the Shim header is a common format for Shim header 1 through Shim header n. The format comprises a label field 211 used by a router for determining an output line and an output label, an Experimental Use (EXP) field 212 for indicating communication quality of a packet in an MPLS network, an S bit field (Bottom of Stack field) 213, which indicates that the label is located at the lowest position when adding two or more Shim headers (hereinafter, "to add a Shim header" is referred to as "to PUSH"), and a Time to Live (TTL) field 214, which indicates the number of routers that the packet can pass through in the network. The format shown in FIG. 6 is the same format described in FIG. 1 on Page 3 of RFC 3032.

Upon receipt of the MPLS encapsulated packet, the router searches a label table using a value of the label field 211 as a search key, and determines an output line and more than one output label. Further, the router determines communication quality of the packet based on a value of EXP, and performs priority transfer control for guaranteeing the communication quality. Furthermore, the router subtracts a value of the TTL field 214 in an input Shim header by one, and sets the value in the TTL field in an output Shim header.

Figure 2:
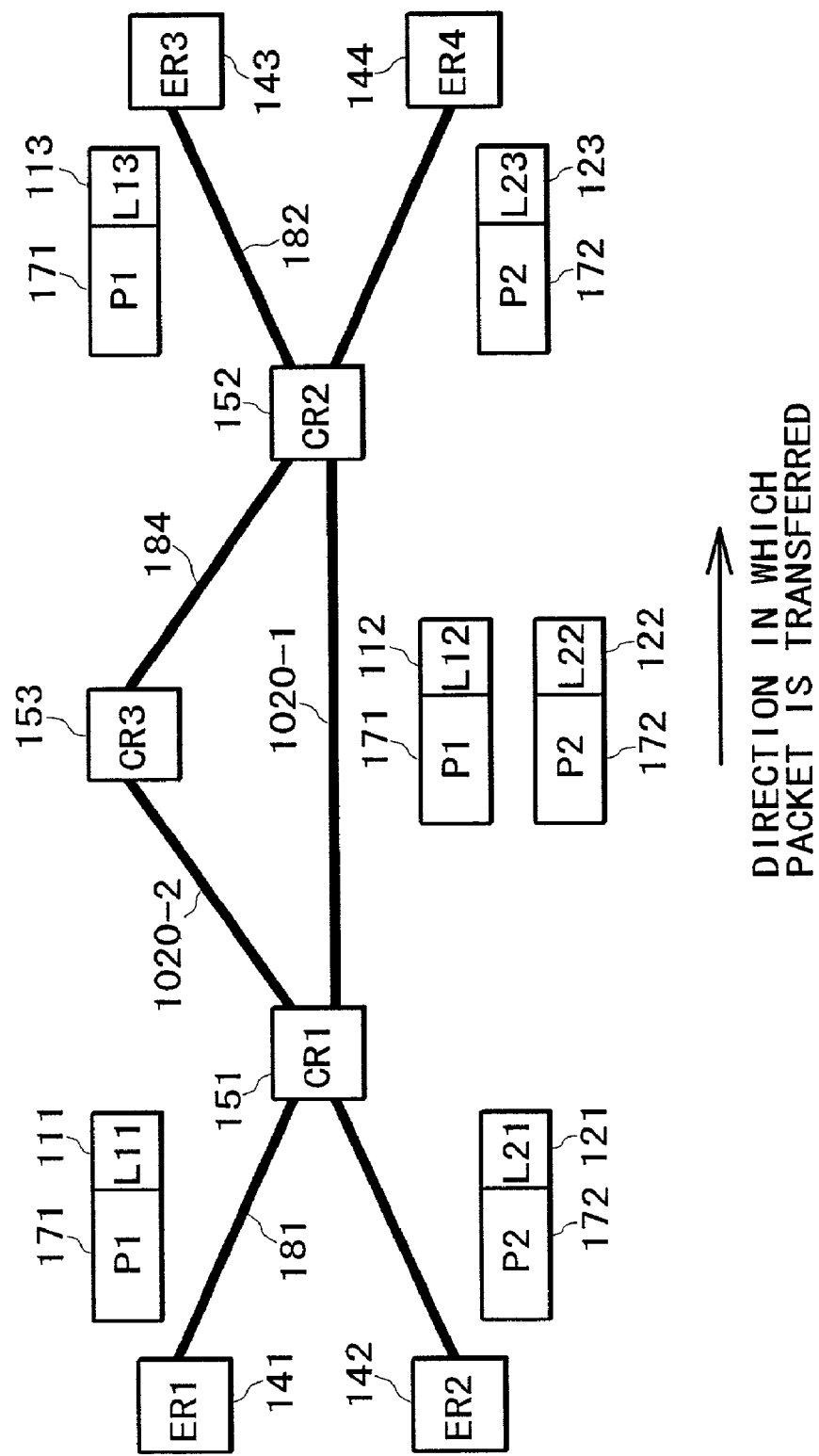
FIG. 2 illustrates a high-speed path switching technique using conventional MPLS.
Figure 3:
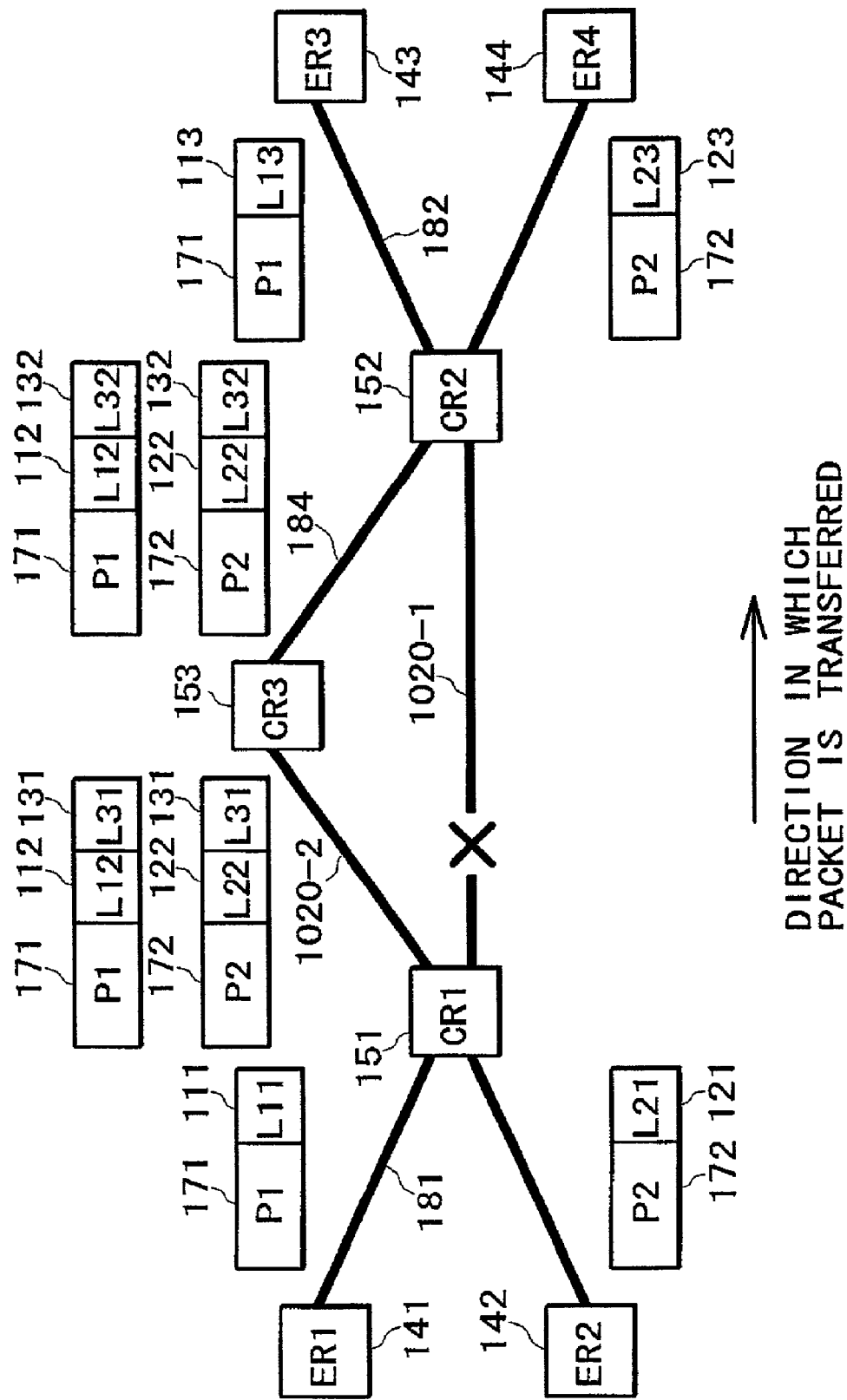
FIG. 3 illustrates a high-speed path switching technique using conventional MPLS.
Figure 4:
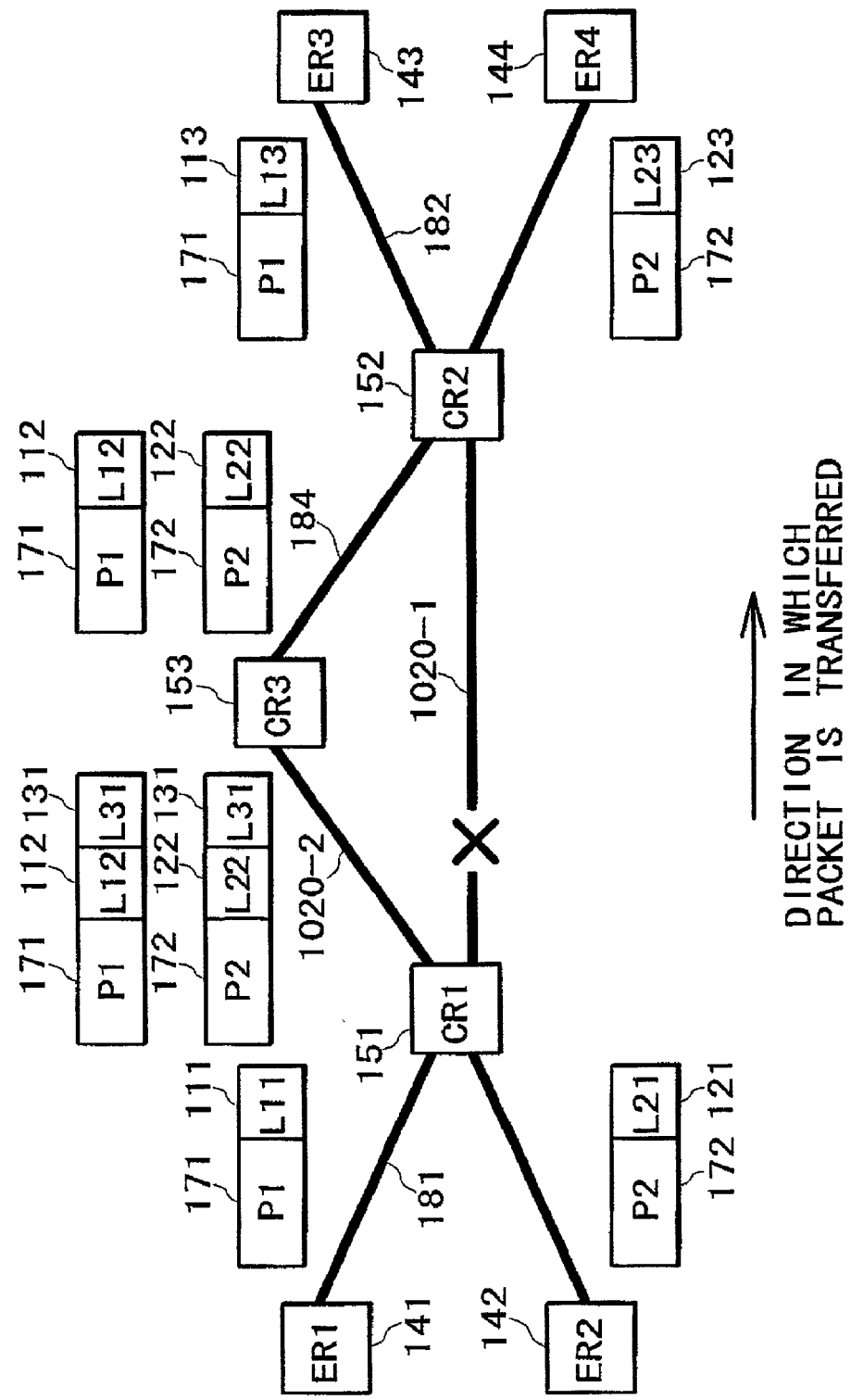
FIG. 4 illustrates a high-speed path switching technique using conventional MPLS.
Figure 7:
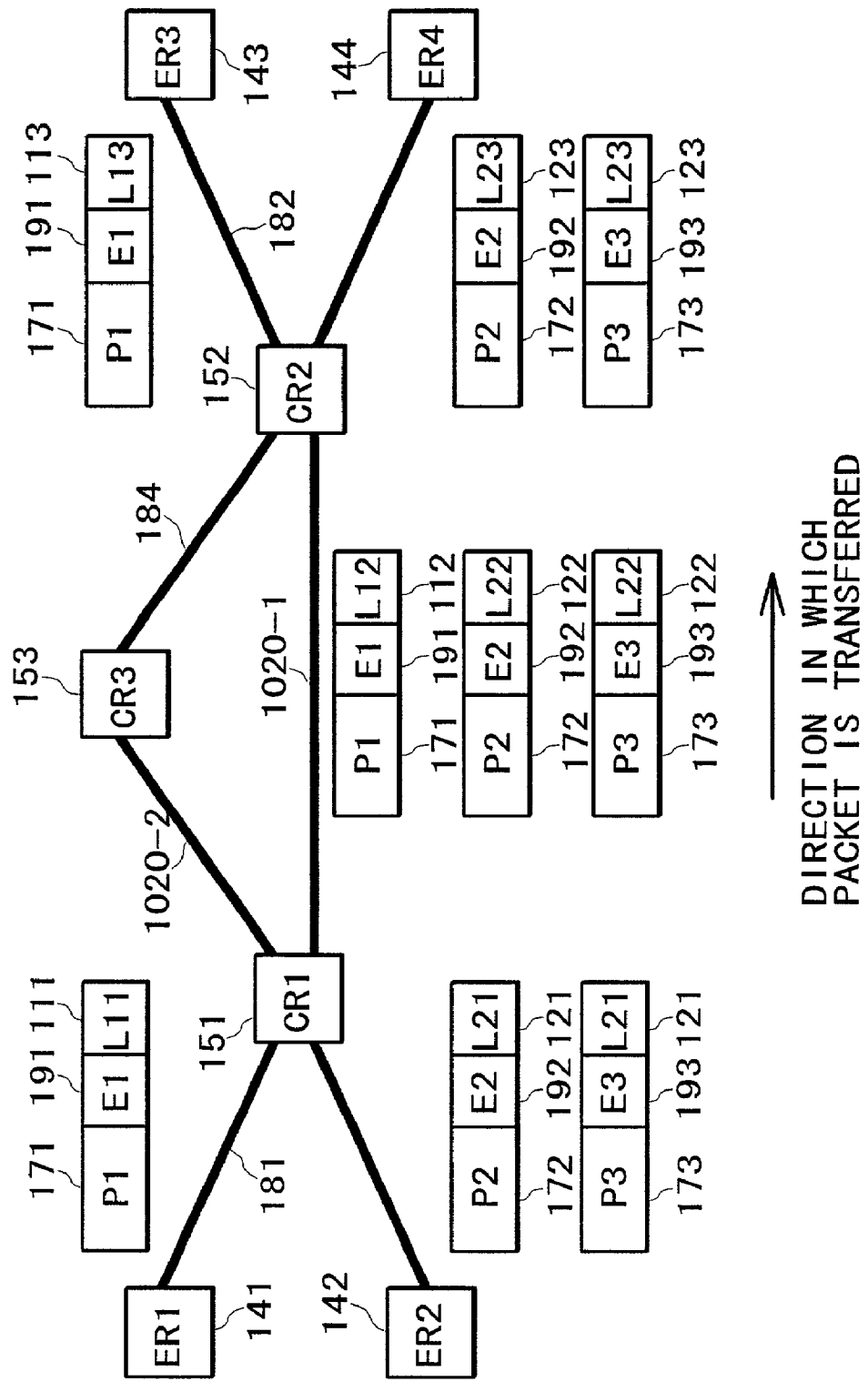
FIG. 7 shows a configuration of an MPLS network to which the router of the present invention is applied.
Figure 8:
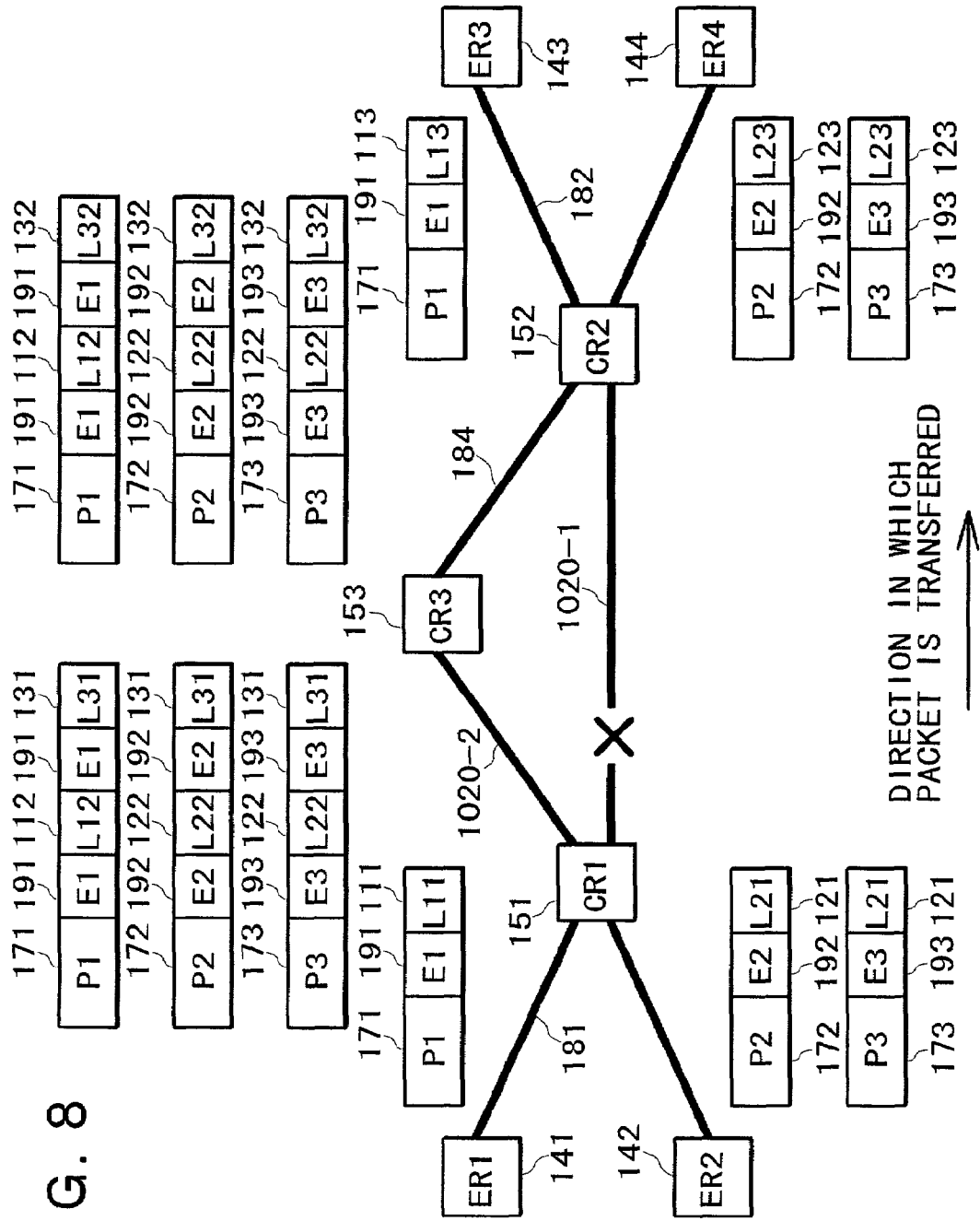
FIG. 8 shows a configuration of an MPLS network to which the router of the present invention is applied.
Figure 9:
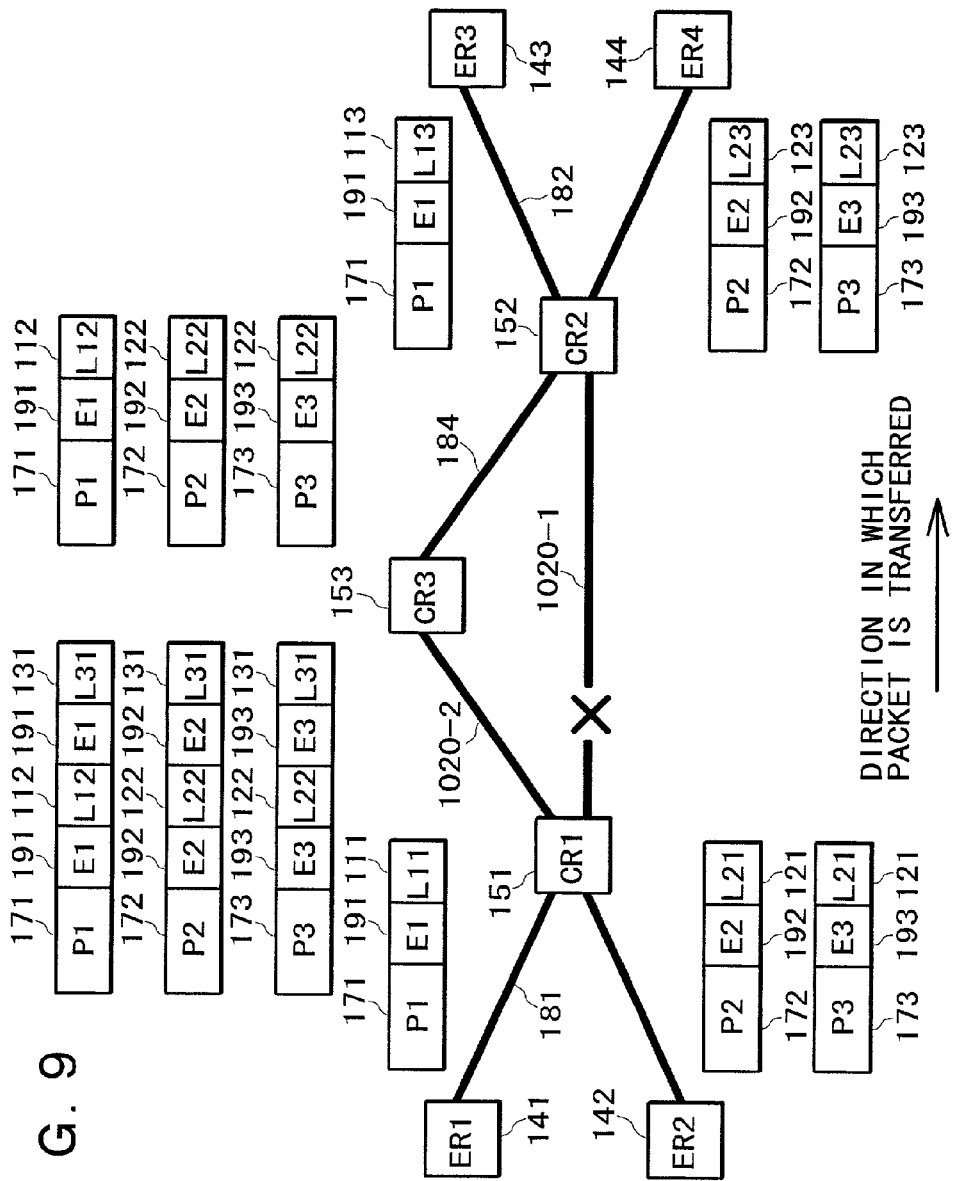
FIG. 9 shows a configuration of an MPLS network to which the router of the present invention is applied.

Now, with reference to FIGS. 7 through 9, a packet transfer operation in the MPLS network constructed by using the router of the present invention will be described. FIGS. 7 through 9 show a structure of the network using the router to which the present invention is applied. FIG. 7, FIG. 8 and FIG. 9 each correspond to FIG. 2, FIG. 3 and FIG. 4. Namely, FIG. 7 shows the case when a line 1020-1 is normal, and FIGS. 8 and 9 show the case when a line 1020-2 has a fault. Further, FIG. 9 shows a packet transfer operation when the router CR3 uses the PHP method. Further, in FIGS. 7 through 9, as information in Shim headers, values of EXP (191-193) in addition to a value of a label is shown.

In FIGS. 7 through 9, the LSP1 is set between the routers ER1, CR1, CR2 and ER3, and the LSP2 is set between the routers ER2, CR1, CR2 and ER4. Further, as a common backup LSP for the LSP1 and the LSP2 in the case when the line 1020-1 has a fault, an LSP3 is set between the routers CR1, CR3 and CR2. In the LSP2, two traffic (packet P2 (172) and packet P3 (173)) requiring two different communication quality guarantee are transferred, and an E2 (192) and an E3 (193) are set as EXP values. Further, as an EXP value of the LSP1, an E1 (191), which is different from the E2 and the E3, is set. The priority shown by each EXP value is the E1, the E2 and the E3, in this order. For example, the packet P1 is data of a Voice Over IP, the packet P2 is data of a real-time system, and the packet P3 is data of Electronic mail.

With reference to FIG. 7, transfer processing of the packet P1 when the line 1020-1 is normal will be described. Upon receipt of the MPLS encapsulated packet P1 by the edge router ER1, the CR1 searches a label table by using an input label L11 and the input EXP value E1 as search keys, and determines the output line 1020-1, the output label L12 and communication quality in the device. Further, the input EXP value E1 is copied, as an output EXP value, to an EXP field in an output Shim header. When showing the output Shim header by using an expression of "(label value, EXP value)", the output Shim header corresponding to the packet P1 is (L12, E1). Then, the CR1 removes an input Shim header (L1, E1) from the packet P1 (hereinafter, "to remove a Shim header" is referred to as "to POP"), PUSHes the output Shim header (L12, E1), and transmits it from the line 1020-1. When transmitting to the line 1020-1, the CR1 performs priority transfer control between the packet P1 and other packets according to communication quality in the device. In this example, since the E1 has the highest priority, it is preferentially transmitted with respect to other packets. The transfer processing of the packet P1 in the CR2 is performed in like manner, and an output Shim header is shown as (L13, E1). Upon receipt of the packet P1 from the CR2, the ER3 removes a Shim header from the packet P1 according to a value of an input label L13, and determines not to PUSH any output label. When the packet P1 is an IP packet which is transferred by an IP protocol, a routing table of the IP is searched and an output line is determined. Then, the ER3 POPs the Shim header from the packet P1, and transmits it to the output line as the IP packet.

The transfer processing of packets P2, P3 when the line 1020-1 is normal is also performed like the transfer processing of the packet P1.

Now, with reference to FIG. 8, transfer processing of the packet P1 when the line 1020-1 has a fault will be described. Upon detecting the fault on the line 1020-1, a line status monitoring section in the CR1 notifies a control section of it. The control section changes an output label with respect to the input label L11 in a label table from L12 to L12 and L31. Further, the control section changes the output line from the line 1020-1, which is used in the current LSP1, to the line 1020-2, which is used in the backup LSP3. Upon receipt of the packet P1, which is MPLS encapsulated by the edge router ER1, the CR1 searches the label table using the input label L11 and the input EXP value E1 as search keys, and determines the output line 1020-2, two output labels L12, L31 and communication quality in the device. Further, as an output EXP value, the input EXP value E1 is copied to EXP fields in two output Shim headers. Therefore, the two output Shim headers corresponding to the packet P1 are (L31, E1) and (L12, E1). Then, the CR1 removes one input Shim label (L11, E1) from the packet P1, PUSHes two output Shim headers, and transmits them from the line 1020-2. Regarding the order of Shim headers to be PUSHed, if a position from which data is transferred first is called a front, the Shim header (L31, E1) is at the front and then comes the Shim header (L12, E1). Further, when transmitting to the line 1020-2, the CR1 performs priority transfer control between the packet and other packets according to communication quality in the device. In the present embodiment, the E1 has the highest priority. Therefore, the E1 is the one to be transferred prior to other packets.

Upon receipt of the packet P1, whose two Shim headers are PUSHed by the CR1, the CR3 searches the label table using the input label L31 in the input Shim header, which is PUSHed at the front, and the input EXP value E1 as search keys, and determines an output line 184, one output label L32, and communication quality in the device. Further, as an output EXP value, the input EXP value E1 is copied to an EXP field in one of the output Shim headers. Therefore, an output Shim header corresponding to the packet P1 is (L32, E1). Then, the CR3 removes one Shim header (L31, E1) at the front out of the two input Shim headers PUSHed in the packet P1, PUSHes one output Shim header (L32, E1), and transmits it from the line 184. Further, when transmitting to the line 184, according to communication quality in the device, the CR3 performs priority transfer control over other packets.

Upon receipt of the packet P1 transmitted from the CR3, the CR2 searches the label table using the input label L32 in the input Shim header PUSHed at the front and the input EXP value E1 as search keys. The CR2 further POPs the input Shim header (L32, E1) at the front, and recognizes that it is necessary to search the label table again using another input Shim header (L12, E1). Then, the CR2 searches the label table again using the input label L12 and the input EXP value E1 as search keys, and determines an output line 182, one output label L13, and communication quality in the device. Further, as an output EXP value, the CR2 copies the input EXP value E1 stored in the second input Shim header to an EXP field in one output Shim header. Therefore, the one output Shim header corresponding to the packet P1 is (L13, E1). Then, the CR2 removes both the input Shim headers (L32, E1), (L12, E1) PUSHed in the packet P1, PUSHes one output Shim header (L13, E1), and transmits it from the line 182. The packet transfer processing of the ER3 receiving the packet P1 from the CR2 is the same as the case when the line 1020-1 is normal.

The transfer processing of the packets P2, P3 when the line 1020-1 has a fault is the same as the transfer processing of the packet P1.

Now, with reference to FIG. 9, the case when the router CR3 uses the PHP method will be described. The packet transfer method of FIG. 9 is the same as the method described in FIG. 8 except that a method of adding Shim headers at the router CR3 immediately before the terminal router CR2 of the backup LSP3, and a label table search at the CR2. Now, transfer processing of the packet P1 by the CR3 and the CR2 will be described.

When adopting the PHP method, upon receipt of the packet P1 whose two Shim headers are PUSHed by the CR1, the CR3 searches the label table using the input label L31 in the input Shim header PUSHed at the front and the input EXP value E1 as search keys. Consequently, the output line 184 and communication quality in the device are determined as in the case of FIG. 8. However, a significant value is not determined as an output label, and only the POPing of the front input Shim header is determined. Then, out of the two input Shim headers PUSHed in the packet P1, the CR3 removes one front Shim header (L31, E1) alone, and transmits it to the line 184. Further, when transmitting to the line 184, according to communication quality in the device, the CR3 performs priority transfer control over other packets. As described above, the Shim header processed by the CR3 is to only POP the front Shim header of the received packet P1, and is different from the case of FIG. 8.

When adopting the PHP method, upon receipt of the packet P1 transmitted from the CR3, the CR2 searches the label table using the input label L12 in the input Shim header, which is PUSHed alone, and the input EXP value E1 as search keys, and determines the output line 182, one output label L13 and communication quality in the device. Further, as an output EXP value, the CR2 copies the input EXP value E1 stored in the input Shim header to an EXP field in one output Shim header. Therefore, one output Shim header corresponding to the packet P1 is (L13, E1). Then, the CR2 removes one input Shim header (L12, E1) PUSHed in the packet P1, PUSHes one output Shim header (L13, E1), and transmits them from the line 182. As described above, unlike in FIG. 8, it is not necessary for the CR2 to search the label table twice, and it can determine an output line and an output Shim header by only one search.

So far, the packet transfer operation in the MPLS network constructed by using the router of the present invention has been described. With the use of the router of the present invention, even when the line has a fault and a packet is transferred by a backup LSP, it is possible for the router in the backup LSP to determine communication quality by using an EXP value, which is used in determination of communication quality in the current LSP. Therefore, even in the backup LSP, the same communication quality as the one in the current LSP can be guaranteed. For example, the packet P1, which is data of the Voice Over IP, is most preferentially transferred whether by the current LSP or by the backup LSP, and its communication quality is guaranteed even when the line has a fault.

Figure 10:
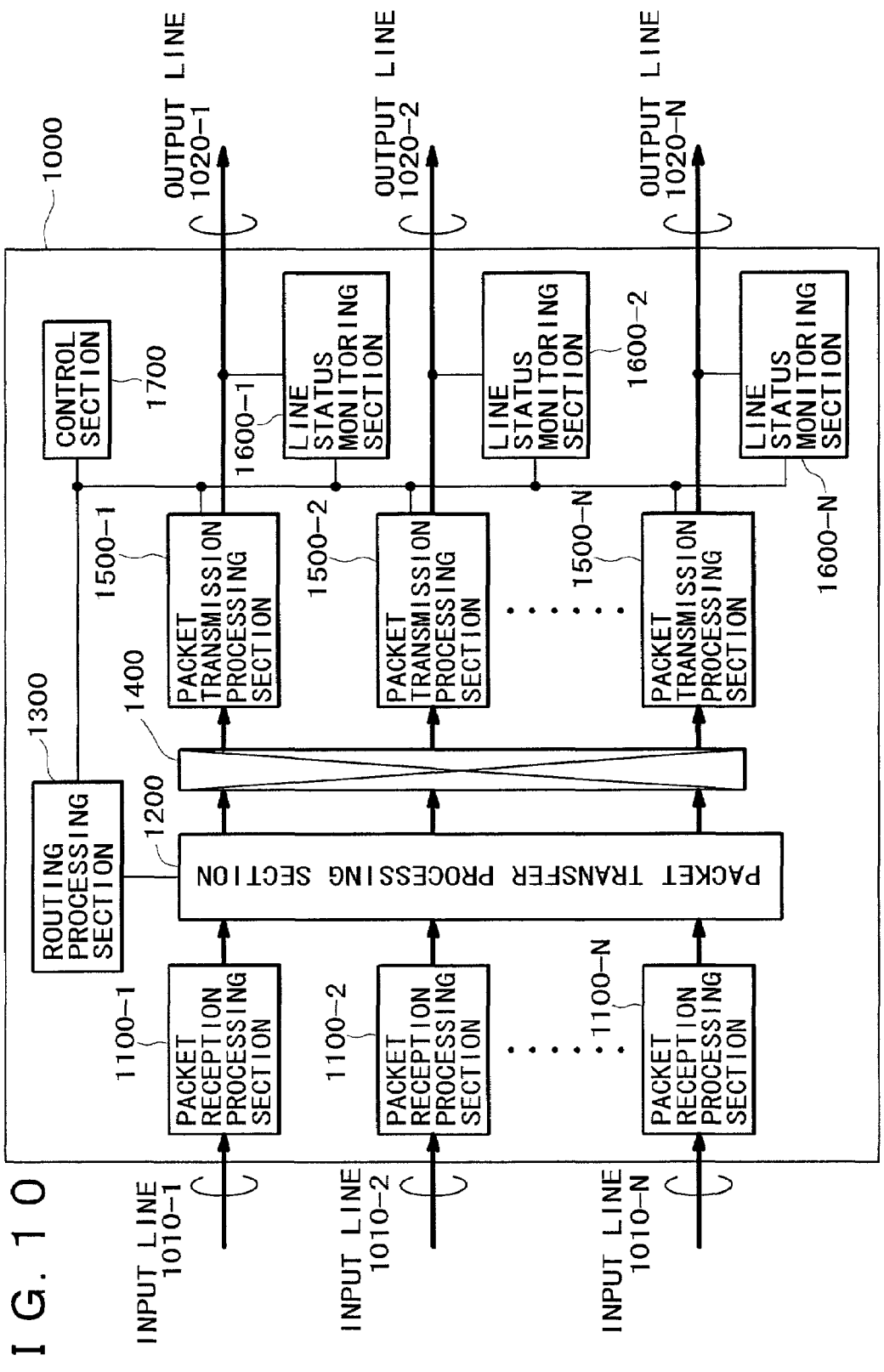
FIG. 10 shows a configuration of the router of the present invention.

Now, with reference to FIGS. 10 through 14, an embodiment of the router of the present invention will be described. FIG. 10 shows a configuration of the router of the present invention. The router 1000 comprises N input lines 1010-i (i=1 to N), a packet reception processing section 1100-i which performs reception processing of packets, a packet transfer processing section 1200, a routing processing section 1300 determining the output lines of packets, a switch 1400 switching packets, a packet transmission processing section 1500-j performing priority transfer control for every output line, a line status monitoring section 1600-j monitoring a line status, N output lines 1020-j where packets are outputted, a control section 1700 performing the overall control of a router and routing processing. The control section 1700 performs setting of each table in the routing processing section and processing of the notice of faults from each line status monitoring section.

Figure 11:
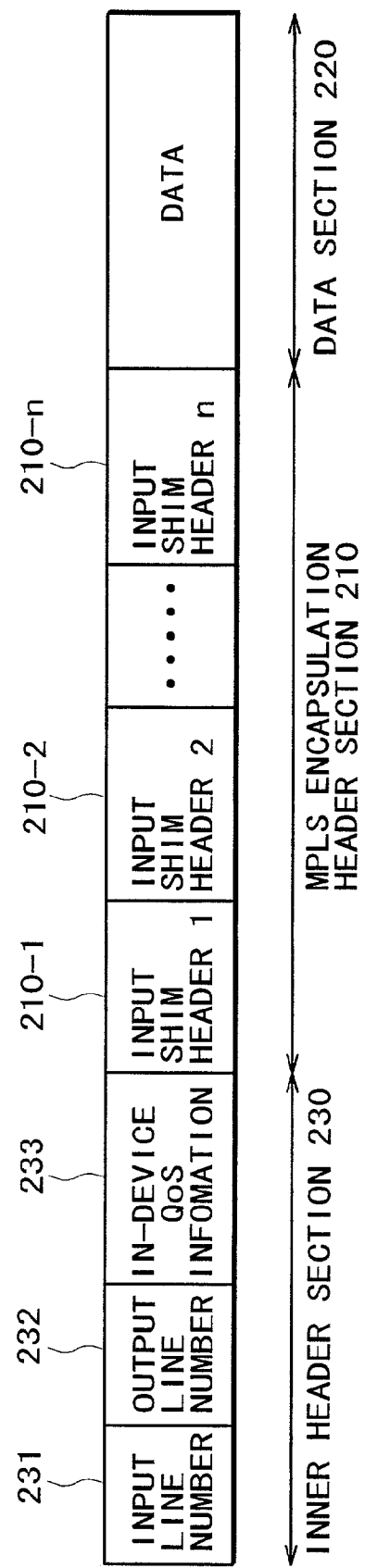
FIG. 11 shows a format of a packet in the router 1000 of the present invention.

FIG. 11 shows an embodiment of a packet format in the router 1000. The format of a packet in the router 1000 is made by adding an inner header section 230 to the format of the packet in the MPLS network. This inner header section 230 comprises an input line number 231, which is an identifier of the line to which the packet is inputted, an output line number 232, which is an identifier of the line to which the packet is outputted, and in-device QoS information 233 indicating communication quality of the packet in the device. In FIG. 11, a Layer 2 header section 200 is removed from the format of the packet in the MPLS network. However, the Layer 2 header section may be added.

When a packet is inputted from the input line 1010-i of the router 1000, the packet reception section 1100-i adds the inner header section 230, and writes a line number i of the input line 1010-i to which the packet is inputted into an input line number 231, and transmits the packet to the packet transfer processing section 1200. At this point, the output line number 232 and the in-device QoS information 233 are insignificant values.

Upon receipt of the packet, the packet transfer processing section 1200 accumulates all of the MPLS encapsulation header section 210, data section 220, and the inner header section 230, extracts the MPLS encapsulation header information 210 and the inner header information 230, and sends them to a routing processing section 1300.

Using the MPLS encapsulation header information 210 and the inner header information 230, the routing processing section 1300 performs the label table search, determines an output line (for example, the line 1020-j), an output Shim header, the number of POPs, the number of PUSHes, and in-device QoS information indicating communication quality of the packet in the device, and notifies the packet transfer processing section 1200 of such information. Further, a configuration and an operation of the routing processing section 1300 will be described later in detail.

The packet transfer processing section 1200 writes a line number j of the output line 1020-j into the output line number 232 in the inner header, and writes the in-device QoS information into the in-device QoS information 233 in the inner header. Further, using the output Shim header, the number of POPs and the number of PUSHes, the packet transfer processing section 1200 rewrites the Shim header in the MPLS encapsulation header section 210. The data length of the MPLS encapsulation header section 210 when inputting and the data length of the MPLS encapsulation header section when outputting may differ according to the number of POPs and the number of PUSHes. In such a case, according to the number of POPs and the number of PUSHes, the data length of the MPLS encapsulation header section is readjusted. Then, the packet transfer processing section 1200 transmits the inner packet to a switch 1400.

According to the output line number 232, the switch 1400 switches the packet, and transmits it to a packet transmission processing section 1500-j for each output line. According to the in-device QoS information 233, the packet transmission processing section 1500-j performs transmission control corresponding to the priority of packets, deletes the inner header section 230, and transmits the packet to the output line 1020-j.

Thus, one embodiment of the router of the present invention has been described.

Figure 12:
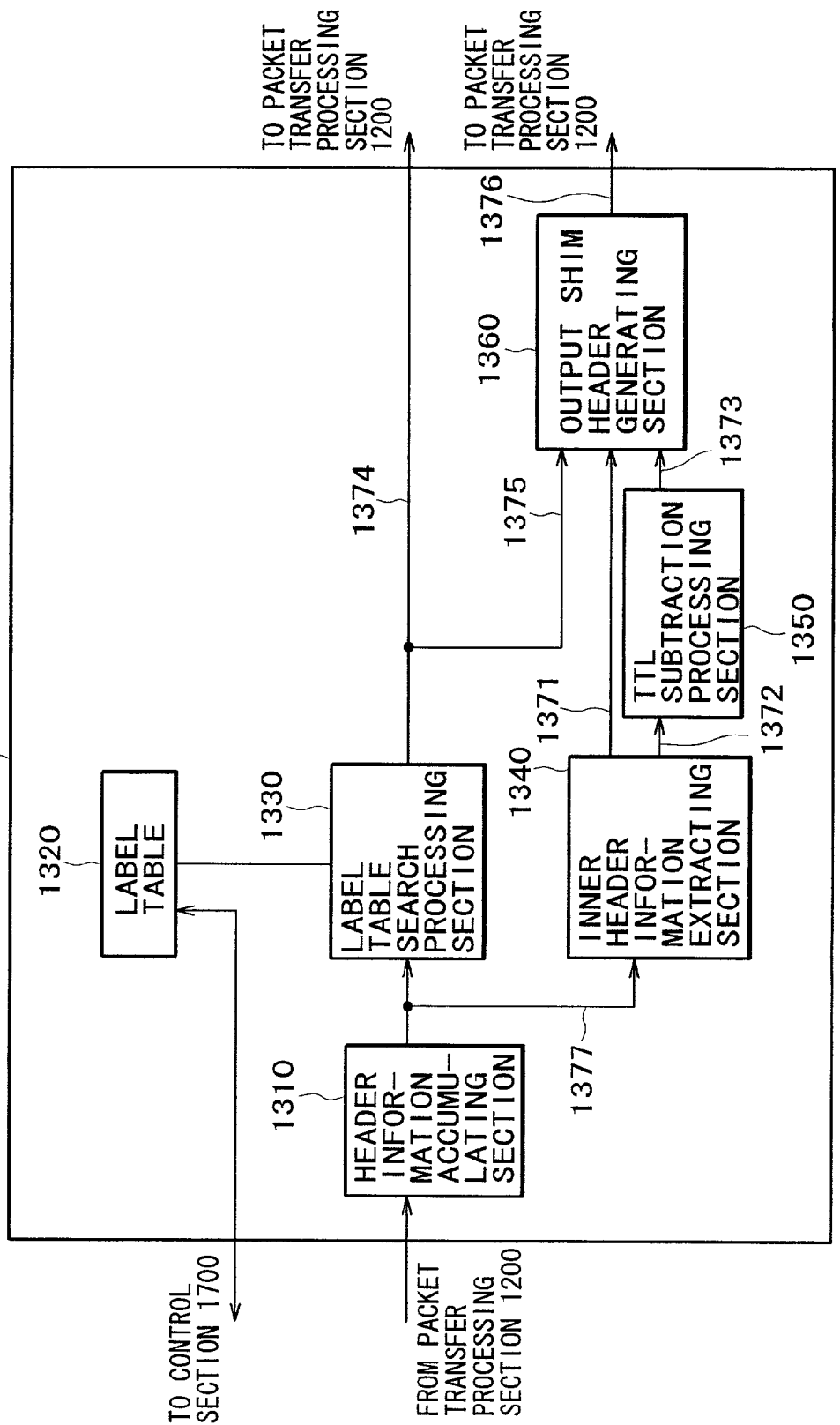
FIG. 12 shows a configuration of the routing processing section 1300.

Now, with reference to FIGS. 12 through 14, an embodiment of the routing processing section 1300 will be described. FIG. 12 shows a configuration of the routing processing section 1300. The routing processing section 1300 comprises a header information accumulating section 1310, a label table 1320, a label table search processing section 1330 searching the label table 1320, an inner header information extracting section 1340, a TTL subtraction section 1350, and an output Shim header generating section 1360.

The header information accumulating section 1310 accumulates the MPLS encapsulation header section 210 and the inner header section 230 received from the packet transfer processing section 1200. The inner header information extracting section extracts an EXP value and a TTL value in the input Shim header accumulated in the header information accumulating section, outputs the EXP value (1371) to the output Shim header generating section 1360, and outputs the TTL value (1372) to the TTL subtraction section 1350. The TTL subtraction section subtracts the TTL value in the input Shim header by 1, and outputs a calculation result (1373) to the output Shim header generating section 1360.

FIG. 13 shows a configuration of the label table 1320. Each entry of the label table 1320 comprises a label 1321 and an EXP 1322, which are search keys, and a search result 1323 corresponding to them. The search result 1323 comprises the number of POPs 1324 of the input Shim header, the number of PUSHes 1325 of the output Shim header, 0 or more output labels 1326 for the number of PUSHes, an output line number 1327, and in-device QoS information 1328. FIG. 13 shows table setting values when the router 1000 is applied to the CR1 in FIG. 7. In this case, the number of POP(s) corresponding to input labels L11, L21 is 1 and the number of PUSH(es) is 1. As for output labels, each one of L12 and L22 are respectively set in a label 1 field (1326-1), and the output line is "1". Further, in order to set in-device QoS information corresponding to an input EXP value, two EXP values E2, E3 are prepared as entries corresponding to the input label L21.

FIG. 14 shows table setting values when the router 1000 is applied to the CR1 of FIG. 8 or FIG. 9. In this case, the number of POP(s) corresponding to the labels L11, L21 is 1 and the number of PUSHes is 2. Output labels are set at label 1 and label 2, and the output line is "2".

Now, an operation of the routing processing section 1300 will be described. Among information accumulated in the header information accumulating section 1310, the label table search processing section 1330 uses information necessary for the label table search as a search key, and searches the label table 1320. The result of the search determines the number of POPs 1324 of the input Shim header corresponding to the search key, the number of PUSHes 1325 of the output Shim header, the output labels 1326 for the number of PUSHes, the output line number 1327, and in-device QoS information 1328. Among them, the number of POPs, the number of PUSHes, the output line number, and the in-device QoS information are outputted to the packet transfer processing section 1200 as they are (1374 in FIG. 12). Further, the number of POPs, the number of PUSHes, and the output label are outputted to the output Shim header generating section 1360 (1375 in FIG. 12). While the label table is being searched, among the information accumulated in the header information accumulating section 1310, the inner header information extracting section 1340 extracts an EXP value in the input Shim header and a TTL value. The EXP value is outputted to the output Shim header generating section and the TTL value is outputted to the TTL subtraction processing section 1350 (1377 in FIG. 12). The TTL subtraction processing section subtracts 1 from the TTL value, and transfers the calculation result to the output Shim header generating section 1360 (1373 in FIG. 12).

Upon receipt of the number of POPs, the number of PUSHes and the output label (1375 in FIG. 12) from the label table search processing section 1330, an EXP value from the inner header information extracting section, and a subtraction result of the TTL value from the TTL subtraction processing section, the output Shim header generating section performs the output Shim header generating processing. At this point, as a label value, the label value received from the label table search processing section is used. As EXP values of a plurality of output Shim headers, the EXP values in the input Shim header received from the inner header information extracting section 1340 are used. Also, as a TTL value, the value made by subtraction in the TTL subtraction processing section 1350 is used. The output Shim header generating section generates output Shim headers for the number of PUSHes and transmits them to the packet transfer processing section 1200.

Thus, one embodiment of the routing processing section 1300 has been described.

Now, with reference to FIGS. 10, 13 and 14, an example of the operation of the router 1000 when the line has a fault will be described. A line status monitoring section 1600 of each line in FIG. 10 constantly monitors the status of the output line. When the line has a fault, the line status monitoring section 1600 notifies a control section 1700 of the occurrence of the fault. Upon receipt of the notice of the fault, the control section 1700 performs a changing operation of the label table 1320 in the routing processing section 1300.

For example, the case when the router 1000 is applied to the CR1 of FIGS. 7 through 9 will be described. The setting of the label table 1320 when the line 1020-1 is normal is shown in FIG. 13. Further, FIG. 14 shows settings of the label table 1320 when the line 1020-1 has a fault. Upon detecting that the line 1020-1 has a fault, the line status monitoring section 1600-1 monitoring the status of the line 1020-1 notifies the control section 1700 of the occurrence of the fault. The control section 1700 recognizes that the line 1020-1 has the fault, and changes the label table entry, which is using the line 1020-1 as a search result, according to the set value of FIGS. 13 to 14. As for the packet to be processed after the change of the label table, transfer processing is performed according to the set value of FIG. 14.

So far, the operation of the router 1000 when the line has a fault has been described. In the above paragraphs, a method of changing the label table after reception of the notice of the fault by the control section 1700 has been described.

Figure 15:
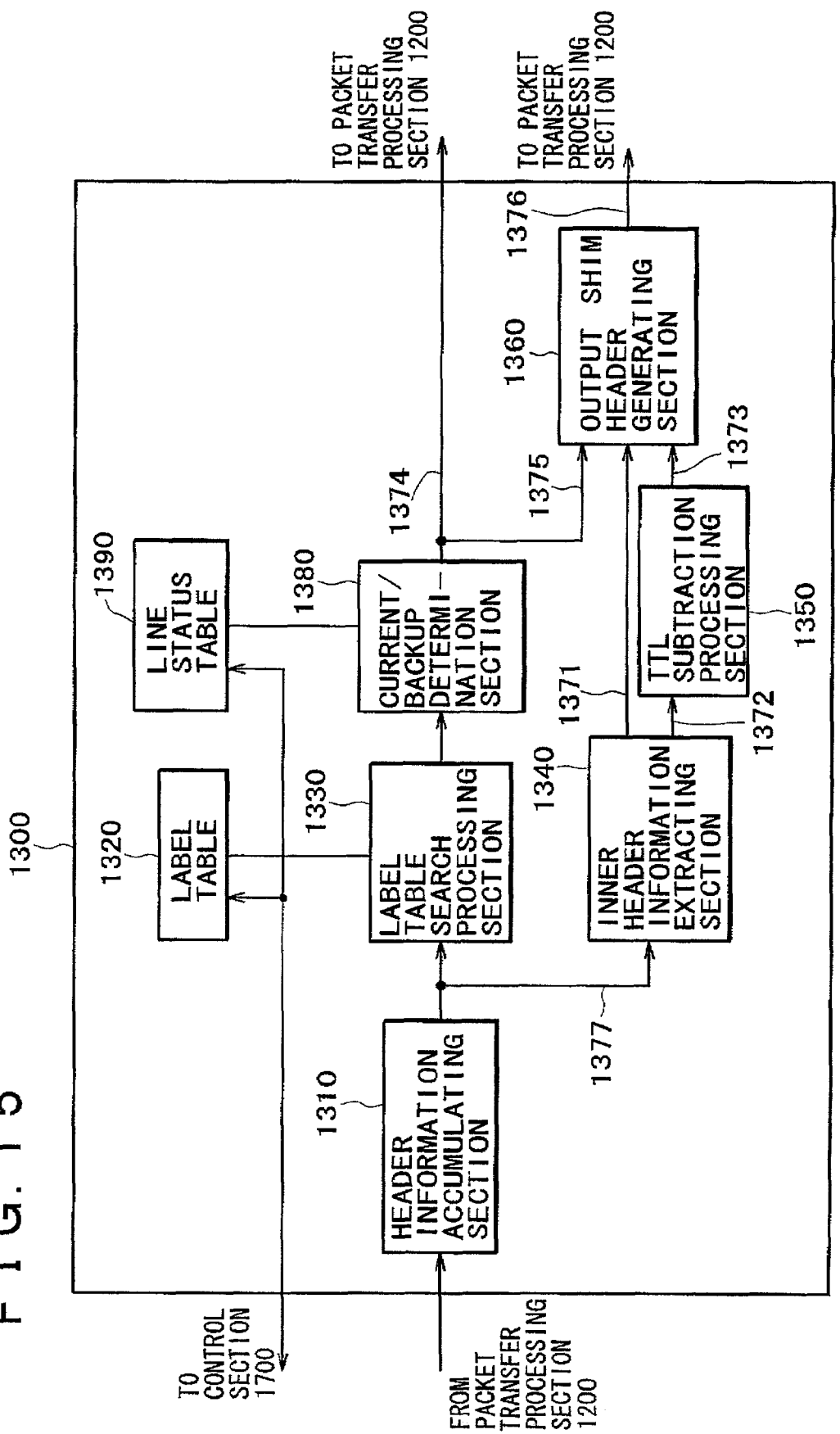
FIG. 15 shows another configuration of the routing processing section 1300, which is different from the one in FIG. 12.

As another embodiment, with reference to FIGS. 15 through 17, a high-speed table switching method will be described. FIG. 15 shows a configuration of the routing processing section 1300 to which the present method is applied. In addition to the Elements shown in FIG. 12, the routing processing section 1300 of FIG. 15 comprises a current/backup determination section 1380 and a line status table 1390. The line status table 1390 is a table to hold bits indicating whether the line status is normal or faulty with respect to all lines possessed by the router 1000. FIG. 16 shows a configuration of the line status table 1390. Shown in FIG. 16 are a line number 1391 and the line status 1392. The line status is set as "0" when normal and "1" when faulty. FIG. 17 shows a configuration of a label table to which the present method is applied. The label table of FIG. 17 has both the current search result 1323-1 and the backup search result 1323-2 with respect to a pair of a label and an EXP, which is a search key. The contents of each search result is the same as those shown in FIGS. 13 and 14.

Now, an operation of the routing processing section 1300 to which the high-speed table switching method is applied will be described. First, among information accumulated in the header information accumulating section 1310, the label table search processing section 1330 uses information necessary for the label table search as a search key and searches the label table 1320. As a result of the search, the current search result 1323-1 and the backup search result 1323-2 corresponding to the search key are obtained. The label table search processing section 1330 outputs these two pairs of search results to the current/backup determination section 1380. Out of the two pairs of received search results, the current/backup determination section 1380 searches the line status table 1390 using a current output line number and a backup output line number as search keys, and reads out the status of the current output line and the backup output line. As a result, when the current output line is normal, the current search result 1323-1 is selected, and necessary information is outputted to the packet transfer processing section 1200 and the output shim header generating section 1360. The necessary information is the same as the one described in FIG. 12. When the current output line has a fault and the backup output line is normal, the backup search result 1323-2 is selected, and necessary information is outputted to the packet transfer processing section 1200 and the output Shim header generating section 1360. When both the current output line and the backup output line have faults, an instruction to discard the packet is given to the packet transfer processing section 1200. Further, copying of the EXP and the TTL subtraction processing are the same as those described in FIG. 12.

So far, an operation of the routing processing section 1300 to which the high-speed table switching method is applied has been described. As described above, both the current search result and the backup search result are prepared in advance in the label table entry. Further, by having the line status table, when the line has a fault, the control section can switch the table only by rewriting the status of the line number where the line table has a fault. Therefore, time required for changing the table can be reduced.

As has been described above, the router 1000 can copy an EXP value in the input Shim header to EXP values in the output Shim headers for the number of PUSHes. Therefore, by applying the router to a switching point (the CR1 of FIGS. 7 through 9) of the current LSP and the backup LSP, the router in the backup LSP can also guarantee the same communication quality as that of the current LSP.

By applying the router of the present invention to the switching point of the current LSP and the backup LSP, the router in the backup LSP can also guarantee the same communication quality as that of the current LSP. Therefore, even when the line has a fault, the same communication quality as in the normal state can be guaranteed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of transferring packets comprising the steps of:

receiving a packet including a header and data, said header containing a label to be used for switching the packet in a network and identification information of communication quality; and transferring the packet to a first output line or a second output line, selectively wherein upon receiving the packet, when the first output line is in a normal state, a first label in a first header of the received packet is rewritten into a new label, and the packet with the new label is outputted to said first output line; and wherein upon receiving the packet when said first output line is in a fault state, the identification information of communication quality in the first header of the packet is copied, a second header containing the copied identification information of communication quality and a second label is added to the received packet, and the packet with the second header is outputted to said second output line.

2. A method of transferring packets according to claim 1, wherein upon receiving said packet when said first output line is in a fault state the first label in said first header is rewritten into a new label as in case of the line being in a normal state.

3. A method of transferring packets according to claim 1, wherein each of said first header and said second header is a Shim header described in Request for comments (RFC) 3032, and said identification information of communication quality is a value of an Experimental Use (EXP) field.

4. A method of transferring packets according to claim 3, wherein said first header and said second header are Shim headers described in Request for Comments (RFC) 3032, a value of the Experimental Use (EXP) field in the first header of said received packet is copied into the Experimental Use (EXP) field in said second header.

5. A router device for receiving packets and transferring each of the packets to one of output lines, each of the packets comprising header information, said header information including a first section containing a label and a second section indicating communication quality of the each of the packets; the router device comprising:

a table having a plurality of entries, each of the entries indicating an identifier of an output line to which an input packet is to be sent and a new label in association with an input label to be extracted from said first section of the input packet, a table search unit for searching said table for an entry, using said first section of the received packet as a search key and determining the output line and the new label corresponding to the received packet, a header information extractor for extracting contents of the second section of said received packet, an output header generator for generating an additional header to be added to said received packet using the new label determined by said table search unit and the communication quality copied from the second section extracted by said header information extractor, a line status monitor for monitoring the status of said output lines, and a controller for receiving a notice of failure from said line status monitor, and changing contents of said table according to said notice of failure.

* * * * *